W. B. FENN.
MACHINE FOR REMOVING CORN FROM THE COB.
APPLICATION FILED OCT. 20, 1914.
1,282,788.
Patented Oct. 29, 1918.
6 SHEETS—SHEET 3.
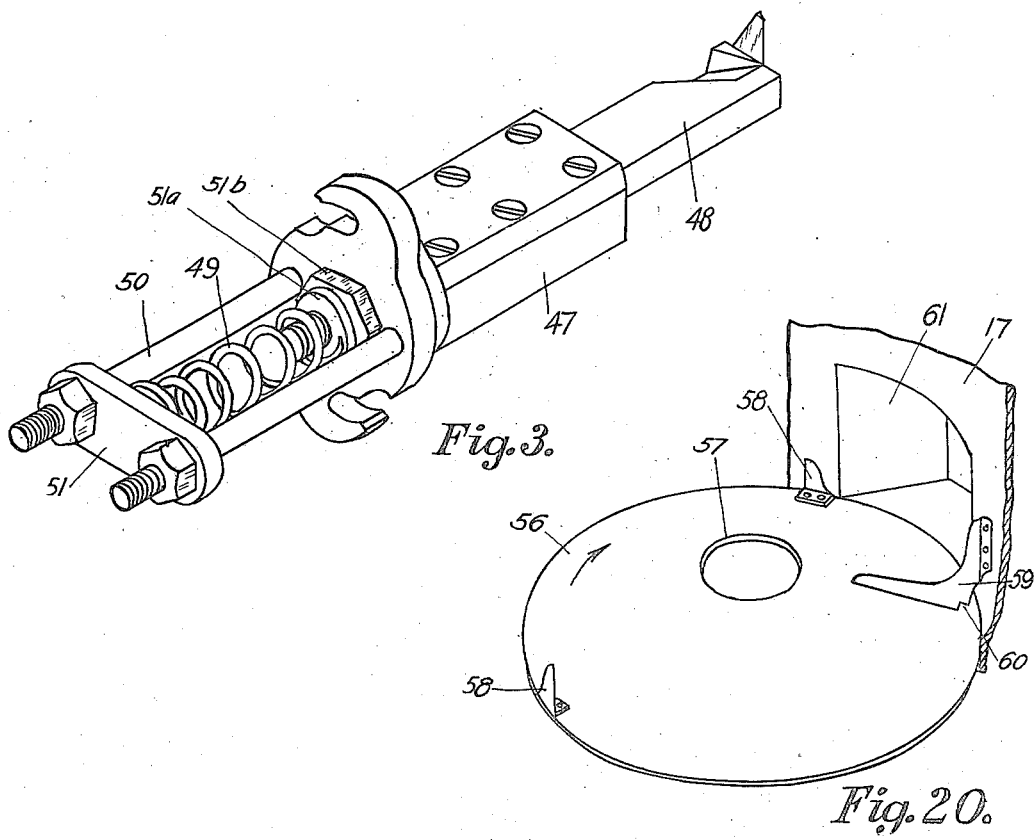
WITNESSES:
Frederick W. Ivrs.
James H. Platt.
William B. Fenn
INVENTOR.
BY
ATTORNEYS.

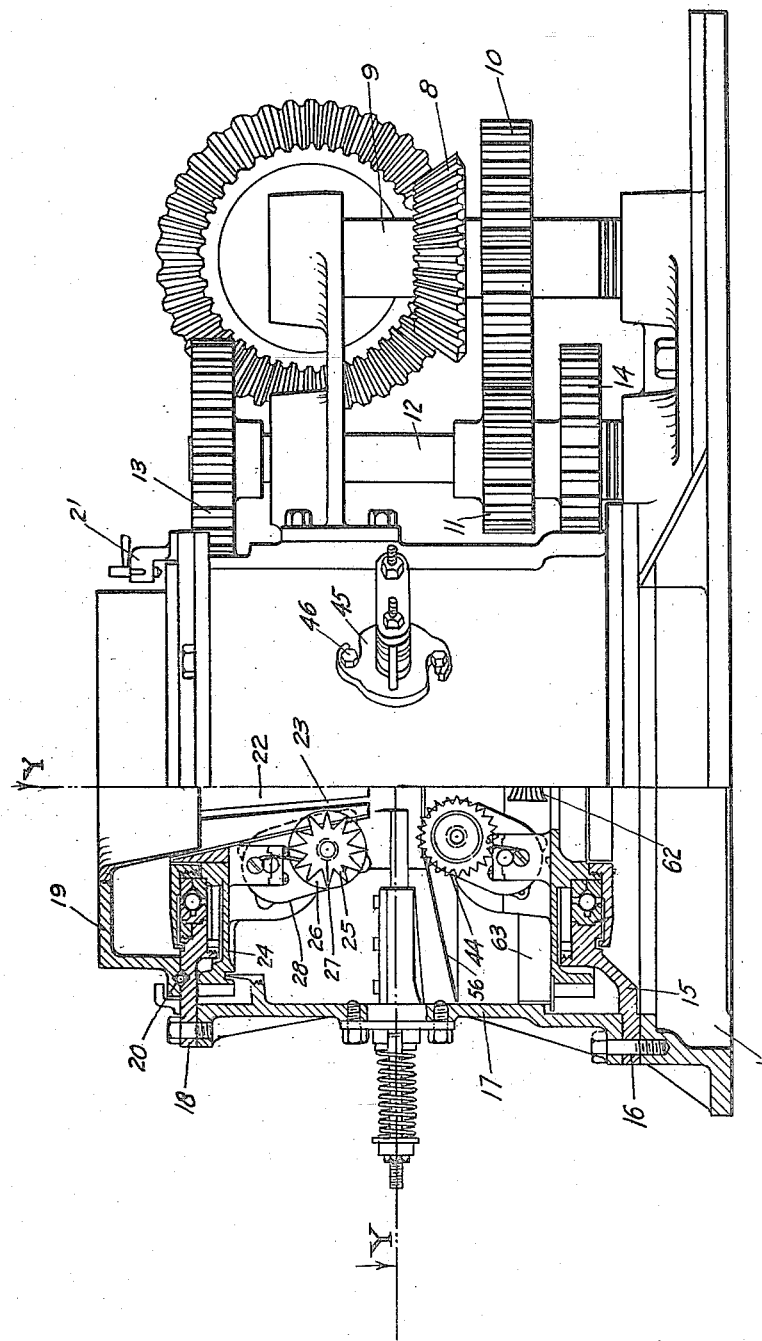

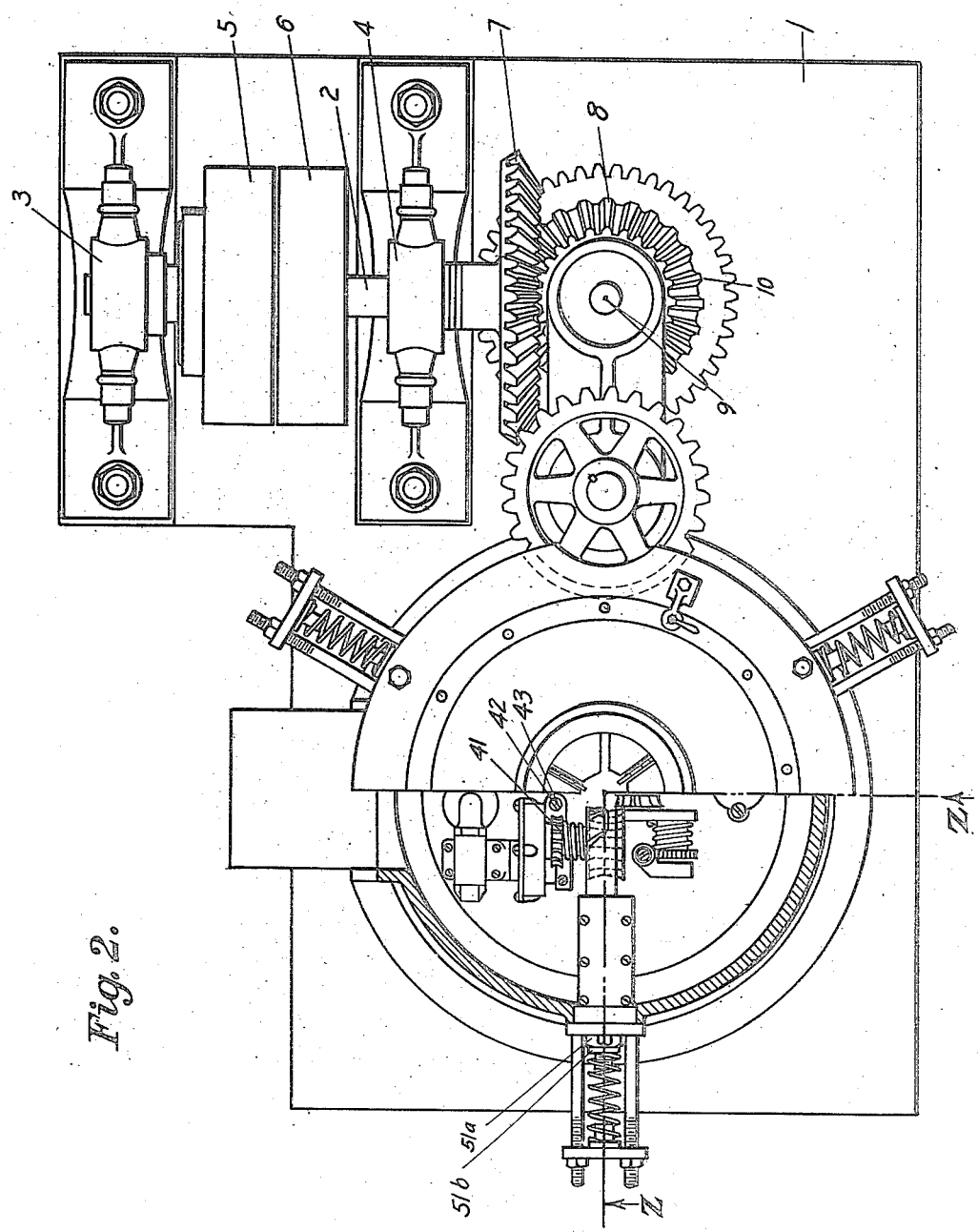

W. B. FENN.
MACHINE FOR REMOVING CORN FROM THE COB.
APPLICATION FILED OCT. 20, 1914.

1,282,788.

Patented Oct. 29, 1918.
6 SHEETS—SHEET 4.

William B. Fenn
INVENTOR.

WITNESSES:
Frederick W. Ives
James H. Platt

BY Edwin T. Corbett
ATTORNEYS.

W. B. FENN.
MACHINE FOR REMOVING CORN FROM THE COB.
APPLICATION FILED OCT. 20, 1914.

1,282,788.

Patented Oct. 29, 1918.
6 SHEETS—SHEET 5.

Witnesses
G. C. Drumm
Frederick W. Ivss.

Inventor
William B. Fenn
By Edwin P. Corbin
Attorney

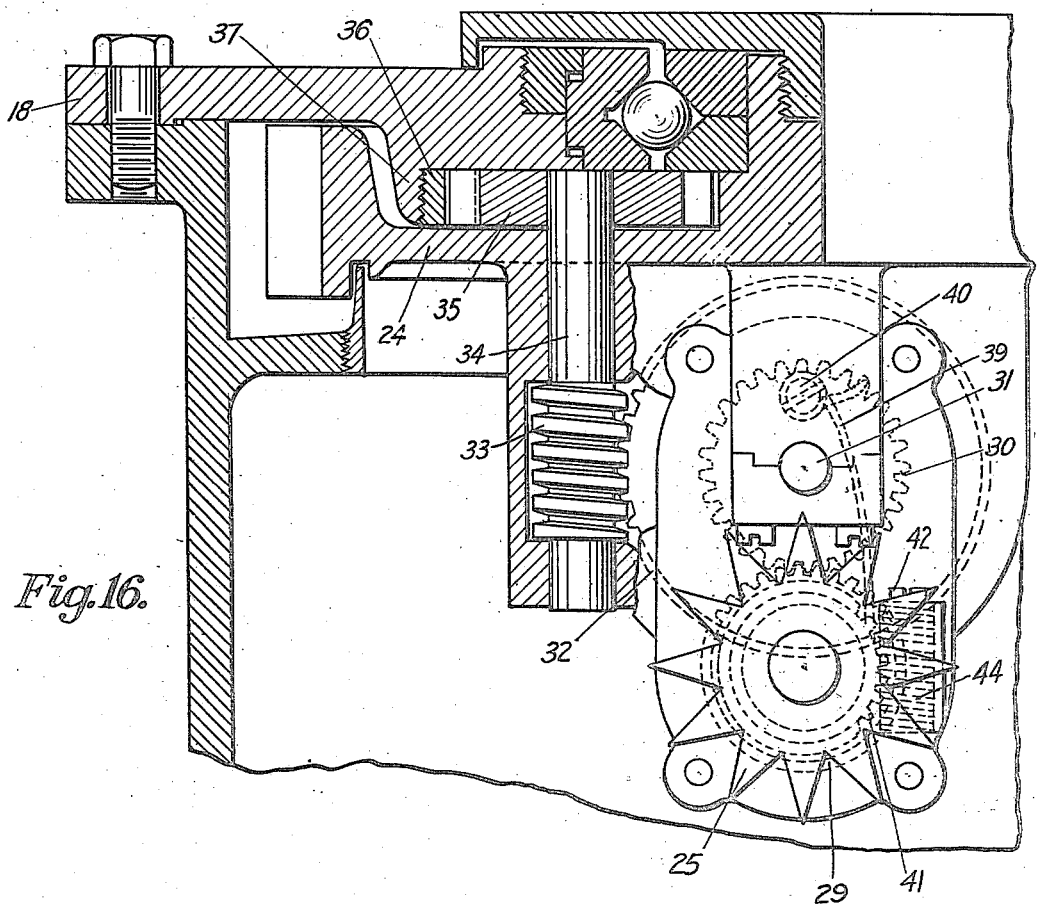

UNITED STATES PATENT OFFICE.

WILLIAM B. FENN, OF COLUMBUS, OHIO, ASSIGNOR TO WEDOIT COMPANY, OF COLUMBUS, OHIO, A CORPORATION OF OHIO.

MACHINE FOR REMOVING CORN FROM THE COB.

1,282,788.   Specification of Letters Patent.   Patented Oct. 29, 1918.

Application filed October 20, 1914. Serial No. 867,617.

*To all whom it may concern:*

Be it known that I, WILLIAM B. FENN, a citizen of the United States of America, residing at Columbus, in the county of Franklin and State of Ohio, have invented certain new and useful Improvements in Machines for Removing Corn from the Cob, of which the following is a specification.

My invention relates to an improvement in machines for removing corn from the cob and aims to provide a machine which will effectively and rapidly remove green corn from the cob without crushing or mutilating the grains of corn and which will produce a clean cut completely removing all corn from the cob.

My invention comprises various features of improvement which coöperate to produce a result inherently superior to any machine today on the market. For instance, I believe that I am the first to invent a machine having features of such a practical nature that the cob may be positively rotated in its passage through the machine and its presentation to the apparatus designed to remove the grains, thus rendering possible the utilization of simple and regulable mechanism for effecting such removal. In the course of producing this improved machine as an entity, I have invented several subcombinations of elements which are possibly applicable beyond the particular type of machine illustrated in the appended drawings forming a part of this specification.

The preferred embodiment of my invention is shown in the accompanying drawings wherein similar characters of reference designate corresponding parts and wherein, Figure 1 is a side elevation, partially broken away, of my improvement.

Fig. 2 is a plan of the structure shown in Fig. 1 with a partial section taken along line *y—y* of Fig. 1.

Fig. 3 is a detail in perspective, showing a removable knife-housing constituting one of the features of my invention.

Fig. 12 is a diagrammatic representation showing the manner in which the cutter elements of Figs. 8 to 11 automatically assume proper cutting angles depending upon the shape of the cob to be acted upon.

Fig. 16 is a side elevation showing one unit of the feeding mechanism and the driving structure therefor.

Fig. 17 is a detail in side elevation of one of the combined feeding and holding cogs forming an improved detail of my improvement.

Fig. 18 is a cross section of the device shown in Fig. 17.

Fig. 19 is a detail in side elevation of a novel controlling spring structure desirably used in each of the feeding units of my machine.

Fig. 20 is a perspective of a centrifugal grain discharging element.

Figure 5:
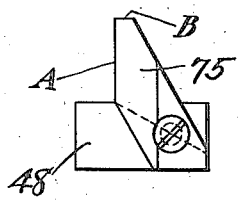
Fig. 5 is an end elevation of the structure shown in Fig. 4.
Figure 4:
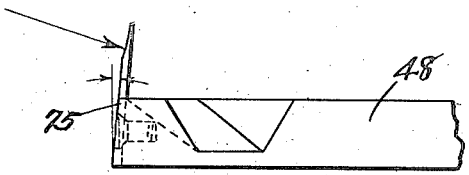
Fig. 4 is a detail in side elevation of one of the knives used by me.

In the drawings, the machine is shown as comprising a base 1 and a shaft 2 supported on standards 3 and 4 and having a loose pulley 5 and a driving pulley 6. This shaft 2 carries a beveled gear 7 meshing with a beveled gear 8 upon a shaft 9 and upon this shaft 9 is a gear 10 meshing with a gear 11 upon the vertical shaft 12. On the upper end of this vertical shaft 12 is a gear 13 and upon the lower end thereof is a gear 14. These gears drive circular racks, to be subsequently indicated, which racks are rigid with rotatable parts of my machine.

The working parts of the machine comprise, in general, a feed structure shown of a nature to guide the cob through the machine vertically; upper feeding and guiding cog structure for feeding the cob and simultaneously precluding rotation relative to such structure; lower gripping and feeding cog structure for similarly feeding and precluding relative rotation; intermediate cutting knives extended into juxtaposition to the path of travel of the cob to such an extent that they will serve to remove the grains of corn from the rapidly rotating cob in its passage through the machine; means for catching the cut grains and centrifugally discharging them from the machine; a means having a digging action on the cob for digging out the roots or points of the grains of corn so that the cob will be left entirely clean when it emerges from the machine.

The main frame-work of the machine comprises a lower ring 15 mounted upon the base 1, a superimposed frame-work 17 of considerable height, and a top plate 18, these parts being bolted together as at 16. These are units upon which the operating parts of the machine are mounted and for the sake of clarity, the parts having definite and comparatively independent functions will be described independently.

The chute structure of the machine is desirably formed in independent units. The uppermost unit is in the nature of a chute 19 which is shown revolubly mounted upon ball bearings 20 and capable of being locked against rotation by the mechanism 21. It may be desirable to have this chute unit rigidly stationary or idly rotatable it being possible under certain conditions that complete rigidity would prove undesirable.

The lower chute unit 22 is slotted as at 23 and is so mounted upon the rotatable disk-like plate 24 that it revolves therewith when such plate is positively driven as is the case when the machine is in operation. It will be understood that the ears of corn are fed into the uppermost chute first and then pass to the chute 22. The slots 22 of the lower chute member extend through the base of such member and thus produce resilient gripping fingers which accommodate the ears of various size and by their resilient, gripping action aid in centering the cob.

The upper feeding and guiding mechanism of the machine (shown best in Figs. 1, 2, 16, 17, 18 and 19) is likewise mounted upon the rotatable plate 24 and comprises star wheels 25 designed to extend into the slots 23 of the chute 22 and provided with supplementary knife-like disks 26 which are rotatable with the star wheels upon shafts 27. These shafts 27 are supported in pivotally depending housings 28 and the star wheels and disks are rotated by driven cogs 29, meshing cogs 30 on shafts 31 and worm wheels 32 which are driven by worms 33. These worms 33 constitute the lower extremities of vertical shafts 34 carried by and extending through plate 24 and having gears 35 at their upper ends which gears are disposed above the rotatable plate 24. The gears 35 are rigidly carried upon the shafts 34 and are driven by meshing with stationary racks 36 threaded into the annulus 37 of the top plate 18.

The plate 24 carries the circular rack before mentioned as being driven by gear 13 and the rotation of this plate necessarily causes rotation of the gears 35 because they are in mesh with the stationary rack 36. The result is that the vertical shafts 34 with worms 33 on their lower ends are rotated, and, through the worm wheel and gearing described, drive the star wheels and disks.

The feeding star wheels 25 in their pivotally depending housings are, under normal conditions, maintained in operative feeding contact with the ears of corn by the normal effect of the rotating cogs 30 upon the cogs 29. To positively insure this action under all conditions, it may be desirable to provide a resilient means for forcing the star wheels inwardly. The mechanism which I have shown to insure this result appears best in Figs. 1, 2, 16 and 19 and it comprises sleeves 38 upon the shafts carrying the star wheels, which sleeves are embraced by torsion springs 39. These torsion springs are rigidly secured at one end to screws 40 and having their other ends secured to worm gears 41 which are adjustable to tension of such springs by means of worms 42 having slots 43 in their upper end facilitating regulation by means of a screw driver.

The lower gripping and feeding cog structure is practically identical with the upper feeding and gripping cog structure with the exception that concave roughened rollers 44 replace the combined star wheels and knife disks. With this difference, the manner of operation is the same, it being understood that the structure is inverted. The similarity of the structure will appear by inspection of Fig. 1 and it will be seen that in both cases the driving and feeding cogs are ultimately driven by worms under the control of circular stationary racks through the medium of gears meshing with such racks and mounted upon the vertical worm shafts.

The knife structure which is disposed intermediate upper and lower feeding mechanism is shown best in Figs. 1, 3 and 4 to 11. It comprises a plurality of knife supports extending radially inward through the casing 17 and readily removable by means of the relative structure of the plates 45 and the bolts 46. Referring to Fig. 3, it will appear that each unit comprises a knife housing 47 and an inwardly movable blade-arm 48, such blade-arm being normally forced inwardly to a regulable extent by means of a coil spring 49 which may be tensioned by studs 50 and the plate 51. A nut 51ª and washer 51ᵇ are provided to adjustably limit inward movement of the blade-arm. It will appear from this that the position of the cutting blade may be varied at will and yet such cutting blade will be yieldable to compensate for irregularities of the corn passing through the machine.

The knife blade, *per se*, designated 75 is of a novel and peculiar form and its structural features and disposition are of utmost importance. In the first place, it is inclined from the vertical (see Fig. 4) so as to conform to the taper of the cobs which are fed through, small end first. This remedies a common fault hitherto existent in machines of this type wherein vertical blades have tended to cut only with their points and have resulted in irregular and inefficient cutting of the grains.

The knife blade is further of such a contour or so positioned that its cutting edge has a definite tangent to the surface of the cob, so that it will adhere to this surface of the cob and use this surface as a guide for the cutting edge. To the best of my knowledge no one has ever used the surface of the cob as a guide for the cutting edge for on the contrary practically every guiding action to regulate the depth of the cut has been by a guiding element in contact with the outer surface of the grains on the cob. It matters not, in my machine how many blades be used to sever the corn from the cob at varying depths. The point is, that the depth of the cut is measured from the surface of the cob outwardly instead of from the surface of the grains inwardly. The exact set of the cutting edge to attain this desired result may be effected by adjustment or by the shape of the blade as shown. In any event, the necessary change of position or angle may be slight but it is vitally important that the edge of this blade be so directed as to insure adherence to the cob surface.

The adherence of the cutting edge of each cutter knife to the cob is primarily attained by the definite shape of the blade and the mounting of this blade and its supporting arm so that the cutting edge travels substantially along a common radius of the ears passing through the machine, regardless of the variations in the sizes of such ears. (See Fig. 2). By having the blade and its arm of definite set or curvature to insure adherence as stated in the preceding paragraph, it is meant that the inner surface of the blade and its cutter arm should be designed for the maximum diameter of the cob so that such adherence will be permitted without interference by surfaces tending to prevent this adherence.

Figure 6:
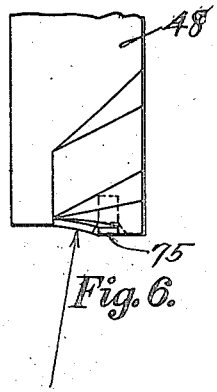
Fig. 6 is a plan view of the structure shown in Fig. 4.
Figure 7:
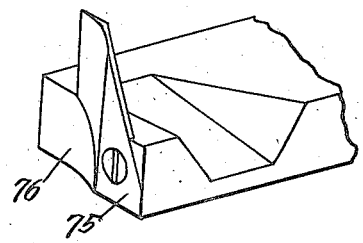
Fig. 7 is a perspective of the structure shown in Fig. 4.
Figure 8:
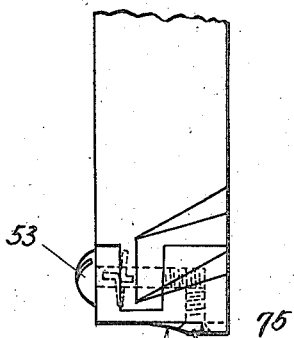
Fig. 8 is a plan view of a modified knife structure, wherein the knife element is pivotally mounted.
Figure 9:
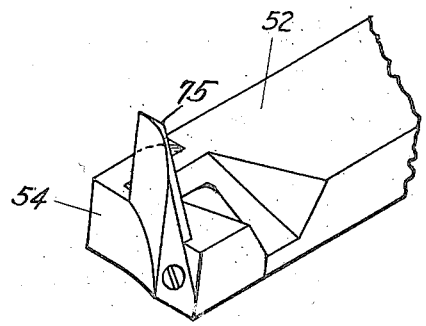
Fig. 9 is a perspective of the structure shown in Fig. 8.
Figure 10:
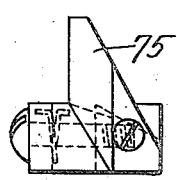
Fig. 10 is an end elevation of the structure shown in Fig. 8.
Figure 11:
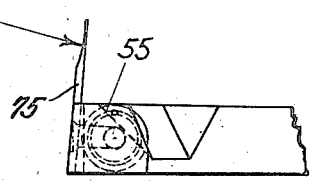
Fig. 11 is a side elevation of the structure shown in Fig. 8.

By reference to Figs. 5 to 7 inclusive, it will be seen that the end of the blade-holding arm is given a definite curvature at 76 to assist in the guiding of this knife at its proper angle. This end of the blade holding arm thus presents a gaging surface directly below the cutting edge of the blade and bearing on the cob, so that the adherence of the cutting edge will not be defeated by a gouging action. This gaging directly below the cutting edge inevitably follows from the shaping of the inner surfaces of the blades and the knife arms to insure adherence as stated above but a failure to gage in a substantially direct line below the cutting edge will be fatally defective for the gaging should be on a radius of all the ears passing through the machine. Otherwise, the desired adherence cannot be attained, for if the gage is substantially out of line and effective on a cob of maximum diameter it will permit gouging on a cob of minimum diameter while, if it is effective on a small cob to cause adherence it must inevitably hold the blade away from the cob with a large cob.

The knife desirably has a vertical cutting edge A and a horizontal cutting edge B with a sharp connecting point.

It would appear that the action of the springs tending to force the blade arms inwardly and the definite set of the cutting edge of the blades are correlated, although they may not be indispensable to each other.

A modified form of the knife structure is shown in Figs. 8 to 11 wherein it will appear that the blade elements are pivotally mounted on the bars 52 by means of bolts 53 and supporting bodies 54 which are controlled by a torsion spring 55 so that the blades are normally thrown outward at their upper ends and yet are yieldable to assume the proper angle depending upon the shape of the cob.

I desire it understood that I claim to be the first to provide a cutting blade adapted to automatically conform to the shape of the cob.

Figure 13:
Fig. 13 is an end elevation of a further modification of the knife structure shown in Figs. 4 to 7, illustrating a blade adjustable to vary the depth of cut.
Figure 14:
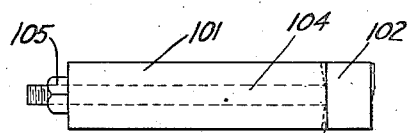
Fig. 14 is a plan of the structure shown in Fig. 13.
Figure 15:
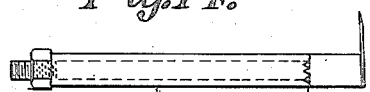
Fig. 15 is a side elevation of the structure shown in Fig. 13.

A further modification of my knife structure is presented in Figs. 13, 14 and 15 and comprises blade-arm 101 with a supplemental blade support 102 carrying a blade 103 and having a bolt 104 extending through the blade-arm 101. This bolt is threaded for the reception of a locking nut 105 and the abutting faces of the members 101 and 102 are complementally serrated as at 106. This structure is to facilitate adjustment of the blade 103 in the manner shown in Fig. 13. This adjustment renders possible the regulation of the depth of cut. The capability of adjustment is illustrated in Fig. 13 by the dotted lines.

The centrifugal grain discharging means is best illustrated in Fig. 20 wherein it is shown removed from the machine. By reference to this figure it will be seen that it comprises a conical plate with an opening in its center. It will appear from Fig. 1 that this conical plate is mounted to rotate with the feeding mechanism and is interposed between the upper and lower feeding cog structures, being located immediately below the inwardly extending cutting knives. The plate is designated 56 and the opening 57 serves to permit the passage of the cob to the lower feeding cog structure. Simultaneously, the grains which have been removed by the cutting knives are projected onto the rotating conical plate and by centrifugal action thrown outwardly toward the edges of this plate. The direction of rotation of the plate is indicated by the arrows in Fig. 20 and it will appear that the plate is extended to fit, with comparative closeness, within the casing 17. There are provided scraping blades 58 upon the conical plate which serve to scrape the interior walls of the member 17. Extending inwardly from the member 17 is a gathering scraper blade 59 cut away as at 60 to facilitate the passage of the scrapers 58, such blade 59 extending radially inward in contact with the conical plate. This blade 59 is placed adjacent to the farthermost side of a discharging opening 61 and, by inspection, it will be apparent that the grains of corn are piled up adjacent to the scraper blade 59 and in the course of time discharge through the outlet 61.

The concave rollers 62 are disposed beneath the lower feeding cog mechanism and are idly rotatable in contact with the cobs passing therethrough. The surfaces of these rollers are desirably concave and are roughened or provided with points to dig out the roots, commonly called chits, of the corn. This rolling, digging, action is in contradistinction to scraping. A receptacle is provided for the cobs and the chits are subsequently separated from such cobs.

In operation, the corn cobs are fed into the guiding chutes and as they approach the feeding and gripping mechanism are firmly grasped between resilient fingers of the lower chute unit, the spur wheels and the knife disks. The spur wheels together with the lower feeding rollers insure feeding action, while the knife disks preclude rotation of the cob in relation to the feeding rollers. The plates 24 and 63 are positively driven by the gears 13 and 14 and the structure of these plates in relation to the casing 17 is such that the product is protected from oil or grease, while the bearings and movable parts are protected from the gummy substances exuding from the corn. It follows, then, that the ear of corn is rotated with its feeding mechanism and is simultaneously fed. Since the knives, when properly adjusted, extend into the path of the grains of corn, these grains are cut from the cob by a spiral cutting action. The pressure of the knives is regulable and the cutting knives are of a nature to adhere to the surface of the cob. It will of course, be understood that each cutting element may have a plurality of blades and, as hitherto explained, the blades may be definitely mounted or adjusted or so mounted as to automatically assume the desired angle depending upon the shape of the cob. It has already been explained that the grains of corn are separated from the cob at the time of cutting and are automatically directed by the circular plate preferably under centrifugal action, to a suitable discharge outlet. It has further been explained that the cogs which drive the star wheels and the lower feeding rollers are effective to sufficiently force the said star wheels and feed rollers into contact with the ear of corn. This action is, however, rendered more certain by springs regulable as to strength and effectiveness.

Also, it has been explained that the upper chute member is either idly rotatable or rigidly mounted depending upon the varying conditions that may arise.

Figure 21:
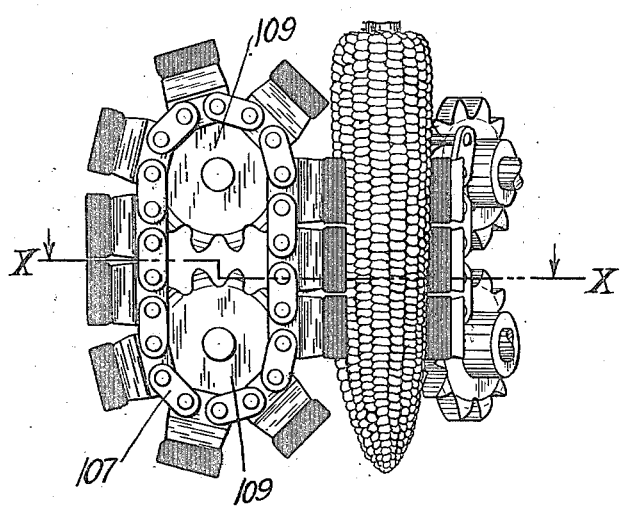
Fig. 21 is a side elevation partially broken away of a modified feeding unit.
Figure 22:
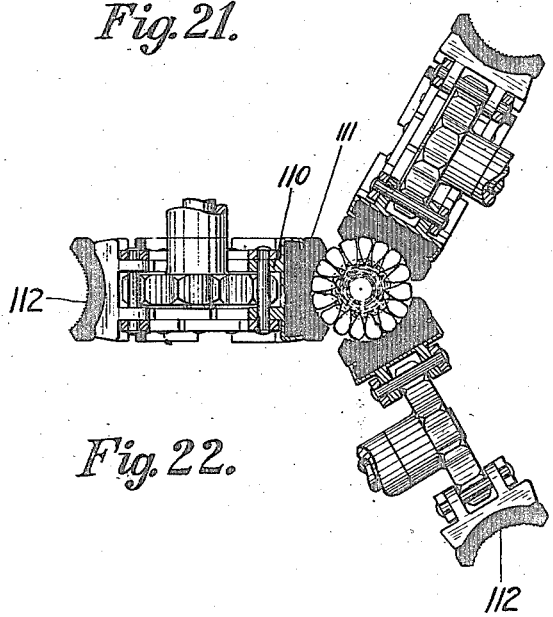
Fig. 22 is a section taken on line *x—x* of Fig. 21.

A modified form of feed unit is illustrated in Figs. 21 and 22 of the drawings. In this form, the ears of corn are fed by a plurality of endless chains made of links 107 and connected by pins 108 operating over sprockets 109.

Forming a part of these chains, are channel blocks 110 carrying rubber or other non-metallic surface elements 111 with concave faces 112 preferably roughened and adapted to grip the ears without mutilation of the grains.

Having thus described my invention, what I claim is:

1. A machine for cutting corn from the cob comprising cutting knives, and means for gripping the sides of an ear of corn and rotating with the corn under subjection to said knives.

2. A machine for cutting corn from the cob comprising cutting knives and means for gripping the sides of an ear of corn and rotating while feeding the corn under subjection to said knives.

3. A machine for cutting corn from the cob comprising cutting knives, feeding elements and means preventing independent rotation of the corn cobs, said elements and means being bodily rotatable while feeding the corn in relation thereto under subjection to said knives.

4. A machine for cutting corn from the cob comprising cutting knives producing a torsional stress on the ears of corn in operation, feeding elements, and rotatable blades biting into the corn cob to preclude independent rotation.

5. A machine for cutting corn from the cob comprising cutting knives exerting a torsional stress on the ears of corn, feeding star wheels for feeding ears of corn to said knives, and rotatable knife disks co-acting with said star wheels to grip the ears of corn.

6. A machine for cutting corn from the cob comprising cutting knives, spaced cob feed elements between which said knives are mounted, and means for diverting cut grain before it reaches the last feed elements.

7. A machine for cutting corn from the cob comprising cutting knives, and a centrifugal device adjacent said knives for discharging the cut grains.

8. A machine for cutting corn from the cob comprising cutting knives, feeding elements below said knives and a plate for catching the cut grains, said plate being between said knives and elements.

9. A machine for cutting corn from the cob comprising cutting knives, and a rotating element adjacent said knives for catching the cut grains.

10. A machine for cutting corn from the cob comprising cutting knives, and a rotating conical element adjacent said knives for catching the cut grains.

11. A machine for cutting corn from the cob comprising cutting knives and a rotating plate for catching the cut grains and having a hole therein for the passage of the cobs therethrough.

12. A machine for cutting corn from the cob comprising cutting knives, cob feeding elements below said knives, a plate for catching the cut grains, and an ejector plate, said first plate being disposed between the knives and elements.

13. A machine for cutting corn from the cob comprising cutting knives and a feed chute rotatable with the ears of corn.

14. A machine for cutting corn from the cob comprising cutting knives, a rotatable feed chute, and a supplemental feed chute normally stationary in relation to said first chute.

15. A machine for cutting corn from the cob comprising cutting knives, a feed chute, and feed elements, said feed chute and feed elements being rotatable together.

16. A machine for cutting corn from the cob comprising cutting knives, a feed chute, feed elements, means preventing rotation of the corn cob with relation to the chute, and means for rotating said feed elements and feed chute.

17. A machine for cutting corn from the cob comprising cutting knives, a feed chute, feed elements, elements rotating with said feed elements to preclude rotation of the corn cob in relation to the chute, and means for rotating the chute and feed elements as a unit.

18. A machine for cutting corn from the cob comprising cutting knives, feed elements, driving mechanism for said feed elements, and a relatively rotatable rack for operating said driving mechanism.

19. A machine for cutting corn from the cob comprising cutting knives, feed elements bodily movable in a circle, a stationary rack, and intermediate mechanism operated by said rack to drive said feed elements.

20. A machine for cutting corn from the cob comprising cutting knives, feed elements on radially movable shafts, and driving mechanism tending to throw said elements inwardly.

21. A machine for cutting corn from the cob comprising cutting knives, feed elements on radially movable shafts, and driving mechanism tending to throw said elements inwardly, and springs for assisting said mechanism in this function.

22. A machine for cutting corn from the cob comprising cutting knives, feed elements on radially movable shafts, and springs tending to throw said elements inwardly, and a worm and gear mechanism for regulating the effect of such springs.

23. A machine for cutting corn from the cob comprising cutting knives, means for rotating the cobs of corn and thus presenting them to the cutting knives, said knives being non-rotatable, and springs for feeding said knives inwardly.

24. In a machine for cutting corn from the cob, cutting knife elements, and blade members thereon automatically adjustable to assume positions conforming to the constantly varying forms of the cobs.

25. In a machine for cutting corn, roughened rollers coactively operative upon the shaved cobs, the roughened parts being constructed to squeeze the chits therefrom.

26. In a machine for cutting corn, idle roughened rollers operative upon the shaved cobs, the roughened parts being constructed to press the chits therefrom.

27. In a machine for cutting green corn from the cob, feeding means, relatively rotating knife structure comprising resiliently held knife arms, and knife blades, the said knife blades and arms being located and positioned to move substantially along a radius of the ears passing through the machine as such ears vary in size and shape.

28. In a machine for cutting green corn from the cob, feeding means, relatively rotating knife structure comprising resiliently held knife arms, knife blades with cutting edges, the said cutting edges and arms being located and positioned to move substantially along a radius of the ears passing through the machine as such ears vary in size and shape, and a gage directly beneath each knife blade.

29. In a machine for cutting green corn from the cob, feeding means, relatively rotating knife structure comprising resiliently held knife arms, and knife blades, the cutting edges of said knife blades being so mounted on said arms that they move substantially along a radius of the ears passing through the machine as such ears vary in size and shape.

30. In a machine for cutting green corn from the cob, feeding means, relatively rotating knife structure comprising resiliently held knife arms, knife blades, the cutting edges of said knife blades being so mounted on said arms that they move substantially along a radius of the ears passing through the machine as such ears vary in size and shape, and a gage for bearing on the cob directly beneath each cutting edge.

31. A machine for cutting corn from the cob comprising cutting knives, and a relatively rotatable element for catching and discharging the cut kernels.

32. A machine for cutting corn from the cob comprising a relatively rotatable disk element for catching the kernels and means for discharging such kernels from the outer edge of such disk.

33. A machine for cutting corn from the cob comprising cutting knives, and a relatively rotatable element beneath said cutting knives to direct the discharge of the cut kernels.

34. A machine for cutting corn from the cob comprising cutting knives, a relatively rotatable element beneath said cutting knives to direct the discharge of the cut kernels and an element relatively rotatable with the aforesaid element adapted to remove the said cut kernels.

35. A machine for cutting corn from the cob comprising relatively rotatable knife blades, said blades having a rectilinear cutting edge positioned longitudinally of the ears, gaging shoes beneath said blades, and means permitting said blades and shoes to yield substantially along a radius of said ears.

36. In a machine for cutting green corn from the cob by a spiral cutting action, cutter knives, means for initially presenting the ears to said cutter knives comprising spaced feed elements yieldably operating upon the sides of the cob, and non-feeding means yieldably bearing upon the sides of the cob and independent of said feed elements to preclude deflection of the ears into the spaces between said feed elements due to torsional stress, said non-feeding means being independent of said cutter knives.

37. In a machine for cutting green corn from the cob by a spiral cutting action, cutter knives, means for initially presenting the ears to said cutter knives comprising spaced feed elements yieldably operating upon the sides of the cob, and funnel segments bearing upon the sides of the cob in the spaces and being yieldable independently of said feed elements, said funnel segments being independent of said cutter knives.

38. In a machine for cutting green corn from the cob by a spiral cutting action, cutter knives, means for initially presenting the ears to said cutter knives comprising radially spaced feed elements yieldably operating upon the sides of the ears, and independently yieldable funnel segments bearing upon the ears in the said spaces, said funnel segments being independent of said cutter knives.

39. In a machine for cutting green corn from the cob, cutter knives, feed elements for introducing the ears initially to said knives, and supplemental guides for said feed elements independent thereof and of said cutter knives.

40. In a machine for cutting green corn from the cob, cutter knives, feed elements for introducing the ears initially to said cutter knives, and supplemental funnel segments for said elements, said segments being independent of said feed wheels and said cutter knives.

41. In a machine for cutting green corn from the cob, ear feeding means comprising spaced yieldable elements operating on the sides of the cob, relatively rotatable cutter knives, and means independent of said knives for preventing escape of the ears between said spaced elements.

42. In a machine for cutting green corn from the cob, ear feeding means comprising spaced yieldable elements operating on the sides of the cob, relatively rotatable cutter knives, and means independent of said knives and of said elements for preventing escape of the ears betwen said elements.

43. In a machine for cutting green corn from the cob, ear feeding means comprising spaced yieldable elements operating on the sides of the cob, relatively rotatable cutter knives, and means independent of said knives for preventing the escape of the ears between said spaced elements, said means being yieldable independently of said elements and being independent of said cutter knives.

44. In a machine for cutting green corn from the cob by a spiral cutting action, rotary knives, and fed roller structure comprising at least three elements operating on the sides of the ears and yieldable along distinct radial lines of the same circle.

45. In a machine for cutting green corn from the cob by a spiral cutting action, relatively rotary knives, and feed roller structure comprising at least three elements operating on the sides of the ears and yieldable in radial planes converging at the longitudinal center of the ears being fed.

46. In a machine for cutting green corn from the cob by a spiral cutting action, relatively rotary knives, and feed roller structure comprising at least three elements operating on the sides of the ears and swingable in radial planes converging at the longitudinal center of the ears being fed.

47. In a machine for cutting green corn from the cob, ear feeding means comprising three or more elements yieldable in an arcuate path longitudinally of said ears.

48. In a machine for cutting green corn from the cob, ear feeding means comprising three or more spaced yieldable elements, each of said spaced elements adapted to move in an arcuate path along a radial of said ears.

49. In a machine for cutting green corn from the cob, toothed feeding wheels so mounted as to yield in an arcuate path longitudinally of said ears.

50. In a machine for cutting green corn from the cob, ear feeding means comprising elements yieldable in an arcuate path longitudinally of said ears, and cutter knives yieldable transversely of said ears, said cutter knives being rotatable with relation to said feeding means.

51. In a machine for cutting green corn from the cob, ear feeding means comprising three or more elements yieldable in an arcuate path longitudinally of said ears, and guiding elements coöperating with said feeding means and yieldable transversely of said ears.

52. In a machine for cutting green corn from the cob, ear feeding means, and guiding means mounted independently of said ear feeding means, said guiding means operative at all times simultaneously with said feeding means.

53. In a machine for cutting green corn from the cob, ear feeding means comprising three or more toothed elements yieldable radially of the ears, the teeth of said elements being operable in the same plane as the yielding movement.

54. In a machine for cutting green corn from the cob, ear feeding means comprising three or more toothed elements yieldable on radii of the ears, the axis of each tooth being in the plane of rotation of said toothed elements.

55. A machine for cutting green corn from the cob comprising cutting knives, and means for tilting said cutting knives to regulate the depth of cut.

56. A machine for cutting green corn from the cob comprising cutting knives, and three or more feeding elements for feeding the ears to said knives, said feeding elements having extended bearing upon the ears.

57. A machine for cutting green corn from the cob comprising feeding means, relatively rotatable knife structure, and blades which bite into the cobs to prevent turning of the cobs under torsional stress.

58. A machine for cutting green corn from the cob comprising knife structure, feeding means, and non-feeding means in conjunction with said feeding means and designed to bear on the cob above the knives.

59. In a corn cutting machine, self-adjusting feeding members adapted to contact with the sides of the ears of corn and means for causing said members to rotate them while feeding them longitudinally.

60. In a corn cutting machine, a means for feeding the ears of corn, and a driving means tending to force said feeding means into operative relation to said ears of corn.

61. In a machine for cutting green corn from the cob, cutter knives, feeding elements for feeding ears through said cutter knives, and blades adjacent said feeding elements for biting into and bracing the ears of corn, said feeding elements and blades being yieldable to conform to the varying contours of the ears of corn.

62. In a machine for cutting green corn from the cob, cutter knives, feeding elements for feeding the ears to said cutter knives and biting ear-bracing blades adjacent said feeding elements yieldable to conform to the varying sizes of the ears.

In testimony whereof I hereby affix my signature in presence of two witnesses.

WILLIAM B. FENN.

Witnesses:
  H. S. CLEMONS,
  JOHN CONNERS.